United States Patent
Vinski et al.

(10) Patent No.: US 10,302,140 B2
(45) Date of Patent: May 28, 2019

(54) SPLINE ALIGNMENT

(71) Applicant: PRATT & WHITNEY CANADA CORP., Longueuil (CA)

(72) Inventors: Johnny Vinski, Chateauguay (CA); Eric Durocher, Vercheres (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 197 days.

(21) Appl. No.: 15/380,193

(22) Filed: Dec. 15, 2016

(65) Prior Publication Data

US 2018/0172078 A1    Jun. 21, 2018

(51) Int. Cl.
| | |
|---|---|
| *B25G 3/28* | (2006.01) |
| *F16D 1/06* | (2006.01) |
| *F02C 7/36* | (2006.01) |
| *F01D 5/02* | (2006.01) |
| *F16D 1/10* | (2006.01) |

(52) U.S. Cl.
CPC ............... *F16D 1/06* (2013.01); *F01D 5/026* (2013.01); *F02C 7/36* (2013.01); *F05D 2250/11* (2013.01); *F05D 2260/36* (2013.01); *F16D 2001/103* (2013.01); *Y10T 29/49895* (2015.01); *Y10T 29/49897* (2015.01); *Y10T 403/7032* (2015.01)

(58) Field of Classification Search
CPC ........ F16D 1/06; F16D 2001/103; F02C 7/36; F01D 5/026; Y10T 29/49895; Y10T 29/49897; Y10T 403/7032

USPC .......................................... 403/359.4
See application file for complete search history.

(56) References Cited

U.S. PATENT DOCUMENTS

| | | | |
|---|---|---|---|
| 4,473,317 A | 9/1984 | Bolang | |
| 6,482,094 B2 | 11/2002 | Kefes | |
| 7,811,052 B2 * | 10/2010 | Guihard | ................ F01D 5/026 |
| 9,890,704 B2 | 2/2018 | Speak et al. | |
| 2016/0257050 A1 | 9/2016 | Benjamin et al. | |

FOREIGN PATENT DOCUMENTS

| | | |
|---|---|---|
| GB | 610104 | 8/1946 |
| WO | WO2017/198999 | 11/2017 |

* cited by examiner

*Primary Examiner* — Greg Binda
(74) *Attorney, Agent, or Firm* — Norton Rose Fulbright Canada L.L.P.

(57) ABSTRACT

A gas turbine shaft assembly comprises first and second axially mating shafts. The first shaft has a circumferential array of splines configured to mesh with a corresponding circumferential array of splines on the second shaft. The first shaft defines at least one axially extending slot aligned with one of the splines on the first shaft. The second shaft has at least one radial projection aligned with one of the splines on the second shaft. The engagement of the radial projection with the slot provides angular correspondence between the splines of the first and the second shafts prior to axial engagement of the splines.

17 Claims, 4 Drawing Sheets

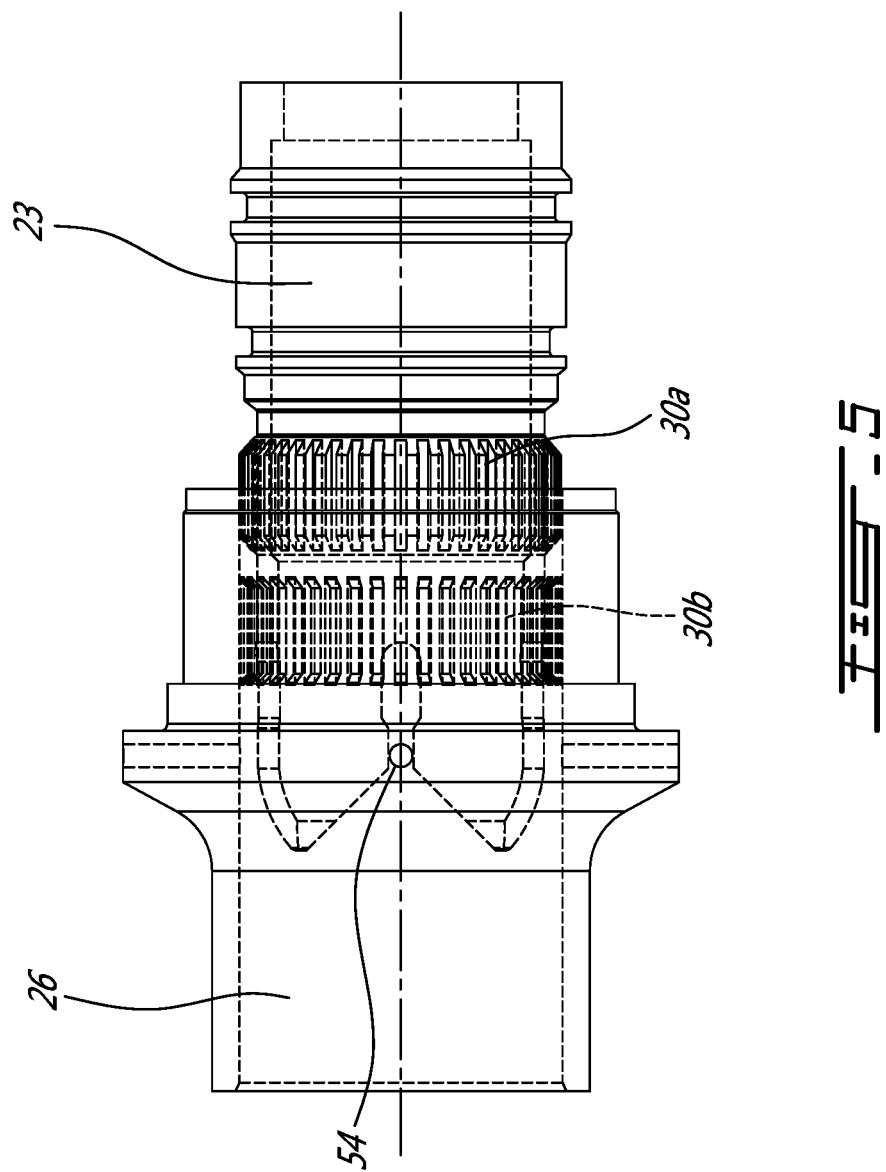

SPLINE ALIGNMENT

TECHNICAL FIELD

The application relates generally to spline assemblies and, more particularly, to spline alignment.

BACKGROUND OF THE ART

Splines are widely used to provide torque transmission between engine parts. In some instances, it may be challenging to ensure proper angular alignment between the splines of the mating parts. This is particularly true for blind assemblies where visual access to the splines is not available while the parts are being drawn together. Misalignment at assembly may result in damages to the splines and eventually compromise the integrity of the spline assembly.

SUMMARY

In one aspect, there is provided a turbine shaft assembly comprising: first and second axially mating turbine shafts, the first turbine shaft having a circumferential array of splines configured to mesh with a corresponding circumferential array of splines on the second turbine shaft, the first turbine shaft defining at least one axially extending slot aligned with one of the splines on the first turbine shaft, the second turbine shaft having at least one radial projection aligned with one of the splines on the second turbine shaft, the engagement of the at least one radial projection with the at least one slot providing angular correspondence between the splines of the first and the second turbine shafts prior to axial engagement of the splines.

In another aspect, there is provided a gas turbine engine comprising: a male member having a circumferential array of axially oriented splines configured to mesh with a corresponding circumferential array of axially oriented splines defined in a female member, the male member having a lead end defining at least one slot for receiving at least one corresponding projection extending radially inwardly from the female member, the lead end of the male member projecting axially forward of the circumferential array of splines of the male member, the at least one slot having a converging entry segment leading to an axial segment aligned with one of the splines on the male member, the at least one projection being aligned with one of the splines on the female member, the at least one projection and the at least one slot being axially positioned relative to the splines of the male and female members so that the at least one projection is guided by the converging entry segment into the axial segment of the at least one slot prior to the splines on the male member engaging the splines of the female member when the male and female members are axially brought together.

In a further aspect, there is provided a method to provide self-alignment between splines of first and second axially mating turbine shafts of a gas turbine engine, the method comprising: providing an alignment slot and a guide pin in respective ones of the first and second axially mating turbine shafts, the alignment slot having an axially converging entry segment followed by an axial segment, the axial segment being angularly aligned with one of the splines of the first turbine shaft, the guide pin being angularly align with one of the splines of the second turbine shaft; axially advancing the first and second turbine shafts towards each other so as to cause the guide pin to engage the converging entry segment of the alignment slot, wherein continued advancement of the guide pin in the converging entry segment of the alignment slot causes the first and second turbine shafts to rotate relative to each other until the guide pin engages the axial segment of the alignment slot, thereby angularly aligning the splines of the first and second axially mating turbine shafts; and further axially drawing the first and second axially turbine shafts towards each other so as to cause the splines of the first turbine shaft to engage the splines of the second turbine shaft.

DESCRIPTION OF THE DRAWINGS

Reference is now made to the accompanying figures in which:

FIG. 5 is a section view illustrating the engagement of a radial projection with a corresponding slot of the spline alignment arranged to provide angular correspondence between the splines of the shaft prior to axial engagement of the spline.

DETAILED DESCRIPTION

Figure 1:
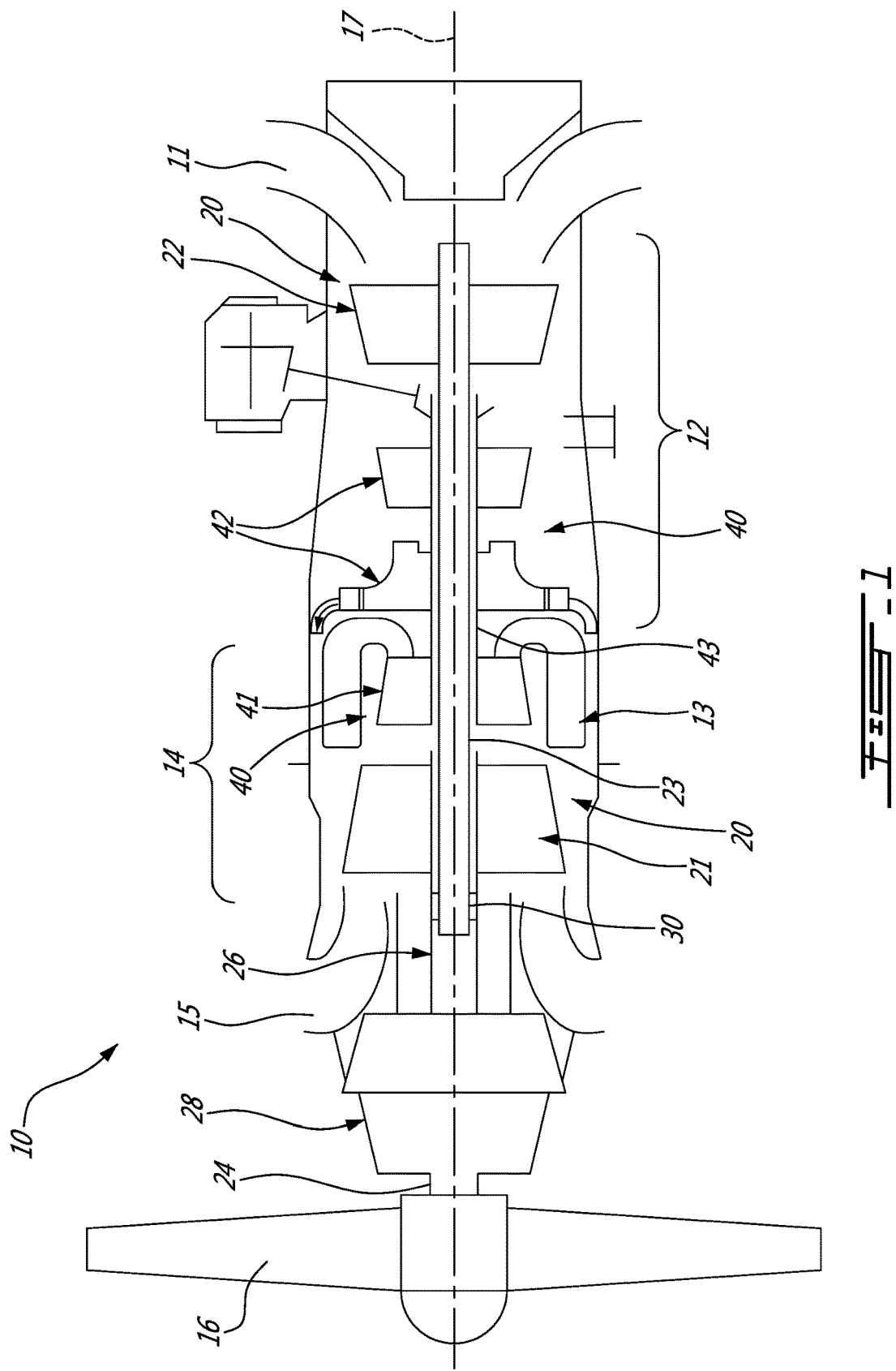
FIG. 1 is a schematic cross-sectional view of a gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. According to the illustrated exemplary embodiment, the engine 10 includes a propeller 16 which provides thrust for flight and taxiing.

Still referring to FIG. 1, the engine 10 has multiple spools which perform compression to pressurize the air received through the air inlet 11, and which extract energy from the combustion gases before they exit the engine via the exhaust outlet 15. More particularly, the illustrated example comprises a low pressure (LP) spool 20 and a high pressure (HP) spool 40. The LP and HP spools 20, 40 are independently rotatable about an engine axis 17. The LP spool 20 and HP spool 40 each has at least one component to compress the air that is part of the compressor section 12, and at least one component to extract energy from the combustion gases that is part of the turbine section 14.

More particularly, the LP spool 20 has an LP turbine 21 (also known as the power turbine), which extracts energy from the combustion gases, and which is drivingly connected to an LP compressor 22 by an LP compressor (LPC) shaft 23. Likewise, the HP spool 40 includes an HP turbine 41 drivingly connected to an HP compressor 42 by an HP shaft 43 rotating independently of the LPC shaft 23 about engine axis 17.

Still referring to FIG. 1, the propeller 16 is drivingly connected to an output drive shaft 24. The drive shaft 24 is, in turn, drivingly connected to a power turbine (PT) shaft 26 via a reductions gear box (RGB) 28. The PT shaft 26 extends forwardly from the LP turbine 21 (i.e. the power turbine) and is drivingly engaged thereto. The PT shaft 26 is distinct from the LPC 23 and mechanically coupled thereto to be driven by the LP turbine 21. In the depicted embodiment, the PT shaft 26 and the LPC shaft 23 are coaxial and interconnected. FIG. 1 shows that the LPC and the PT shafts 23, 26 are drivingly connected with a spline coupling 30. The spline coupling 30, which can include a circumferential array of axially oriented teeth or splines on the LPC shaft 23 that mesh with a corresponding circumferential array of splines in the power shaft 26 (or vice versa), allows for the transfer of torque between the PT shaft 26 and the LPC shaft 23. In the depicted embodiment, the LPC shaft 23 extends at least partially within the PT shaft 26, such that the meshing splines transfer the rotational drive or torque generated by the LP turbine 21 from the PT shaft 26 to the LPC shaft 23. Accordingly, the LPC shaft 23 may be viewed as a male member and the PT shaft 26 as a female member.

Aligning a spline coupling between two such large mating structures (the PT assembly and the LPC assembly) may be challenging. Indeed, with such large and heavy assemblies, it is difficult for the assembler to feel the engagement of the splines and since the assembler has no or little visual access to the splines during assembly, there is always a risk that the splines be not properly aligned and as a result be damaged while the LPC shaft 23 and the PT shaft 26 are being axially brought together. Therefore, a structure and a method to provide self-alignment and allow for a blind assembly are desirable.

Figure 2:
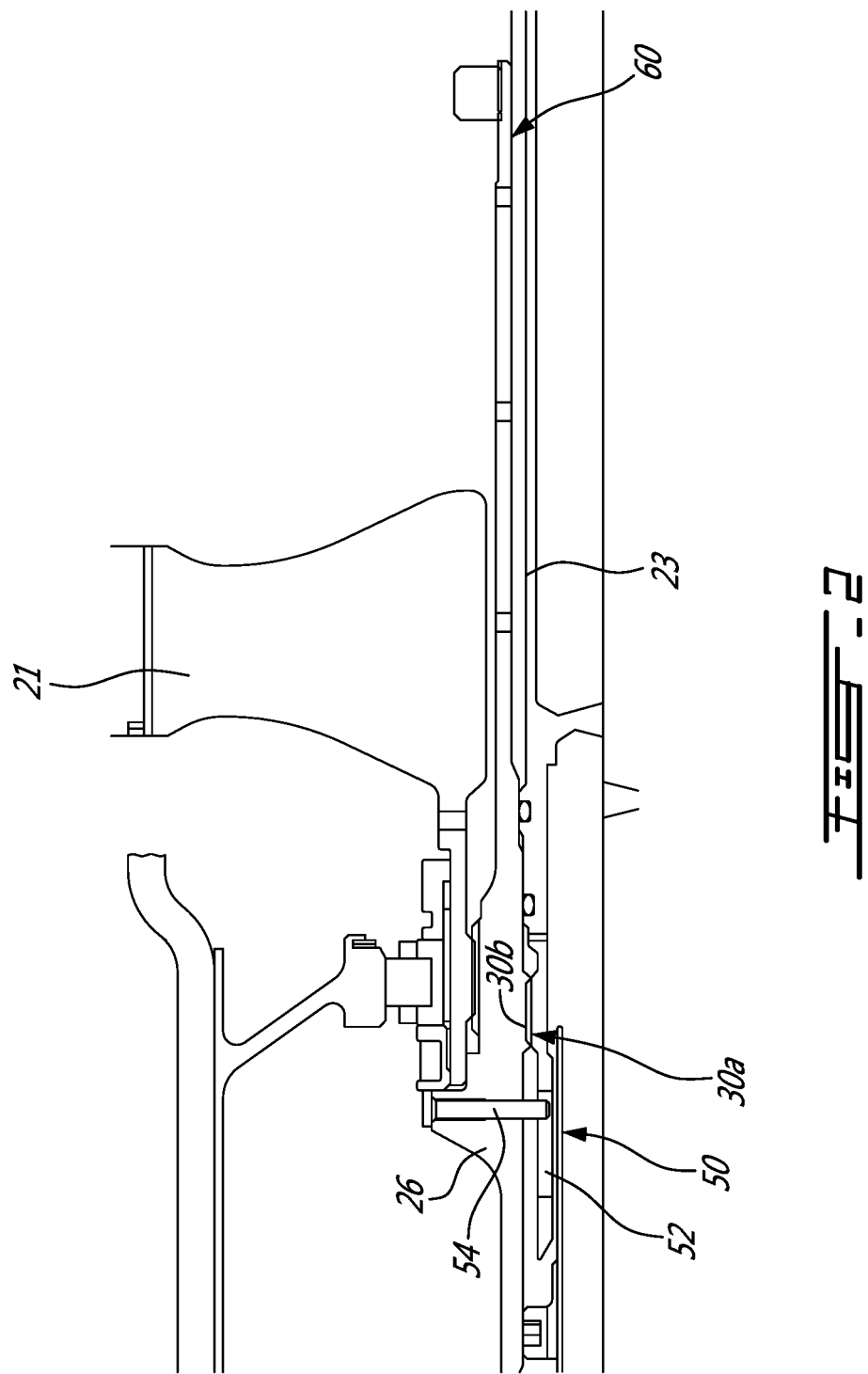
FIG. 2 is a cross-section illustrating a spline coupling between a low pressure compressor (LPC) shaft and a power turbine (PT) shaft of the engine shown in FIG. 1.
Figure 3:
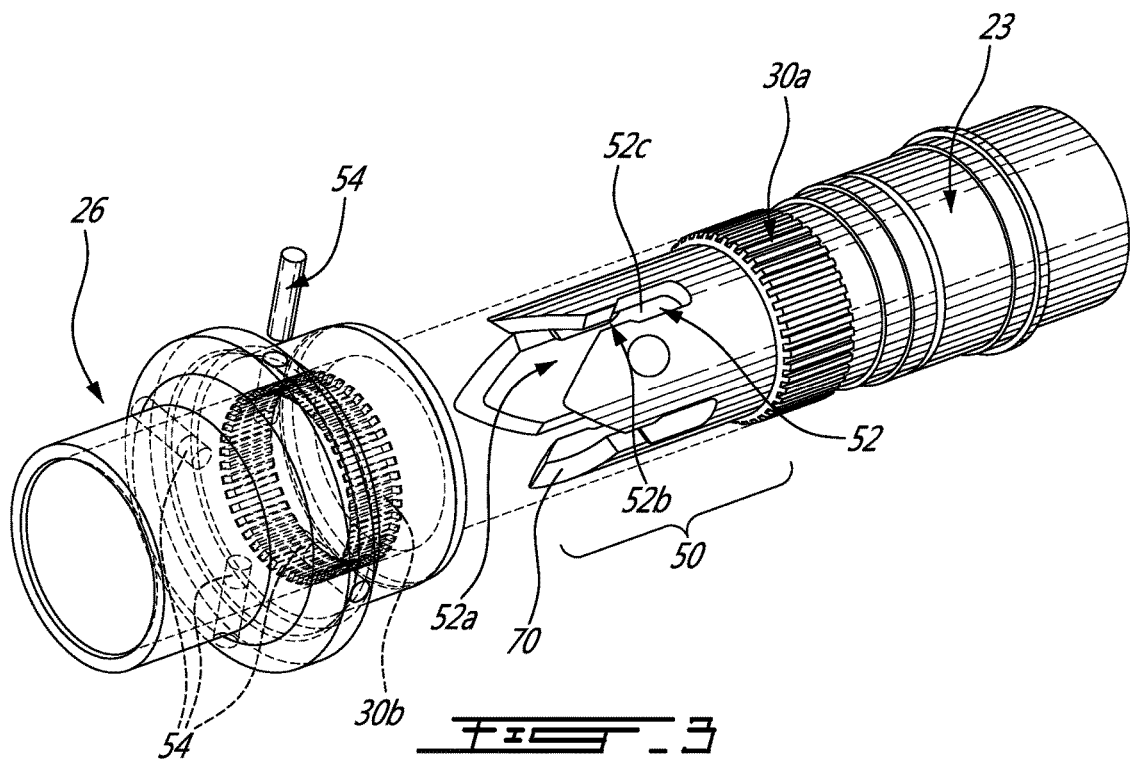
FIG. 3 is an isometric view illustrating a spline alignment arrangement for a spline shaft during blind assembly.

Referring concurrently to FIGS. 2 and 3, it can be appreciated that the LPC shaft 23 is provided on an outer diameter thereof with a circumferential array of male splines 30a for meshing engagement with a corresponding circumferential array of female splines 30b provided on an inner diameter of the PT shaft 26. According to the illustrated embodiment, the LPC shaft 23 has a leading end 50. The male splines 30a are axially inward of the lead end 50. Indeed, as shown in FIG. 3, the lead end 50 of the LPC shaft 23 extends axially forward of the splines 30a so as to penetrate into the PT shaft 26 prior to the male splines 30a. At least one alignment slot 52 (4 in the illustrated embodiment) is defined in the lead end 50 of the LPC shaft 23 for engagement with at least one corresponding projection, such as a guide pin 54, projecting radially inwardly from the PT shaft 26, each pin 54 being aligned with a corresponding one of the splines 30b in the PT shaft 26. As shown in FIG. 2, the pin 54 can be removably mounted in a radial hole defined through the PT shaft 26. Alternatively, the projection could be integral to the PT shaft 26. Each slot 52 has a converging entry segment 52a leading to an axial segment 52b angularly aligned with one of the splines 30a on the LPC shaft 23. The axial segment 52b has a width in a circumferential direction corresponding to that of the pin 54 (i.e. the pin 54 is sized to fit tightly in axial segment 52b of slot 52). In the illustrated embodiment, the converging entry segment 52a is provided in the form of a triangular slot to provide coarse alignment to the guide pin 54. Accordingly, as the PT shaft 26 and the LPC shaft 23 are brought axially closer together, the pin 54 will contact the surface of the converging entry segment 52a of slot 52 causing the shafts 23, 26 to rotate and align with the axial segment 52b of alignment slot 52. Once the axial segment 52b of slot 52 is engaged, the male and female splines 30a, 30b will be angularly aligned and as the shafts 23, 26 are brought axially closer, the male and female splines 30a, 30b will be engaged. Once the splines 30a, 30b are engaged, the pin/slot alignment is no longer required, so the axial segment 52b may axially merge into an enlarged end segment 52c in order not to interfere with the assembly. That is the width of the end segment 52c may be made larger than that of the pin 54 to provide clearance with the pin 54 when the splines 30a, 30b are engaged.

From the foregoing, it can be appreciated that the guide pin 54 and the alignment slot 52 with its converging entry segment 52a and associated axial segment 52b cooperate to provide angular correspondence between the male and female splines 30a, 30b prior to the male splines 30a axially engaging the female splines 30b. This can be appreciated from FIG. 5. This self-alignment arrangement contributes minimizing the risk that the splines be damaged during assembly.

According to another embodiment, the alignment slot could be provided on the PT shaft 26 and the guide pin on the LPC shaft 23. It is understood that the guide pin would project radially outwardly from the LPC shaft 23 for engagement with a slot defined in a surrounding portion of the PT shaft 26. This reverse slot and pin arrangement could, for instance, be provided in area 60 of FIG. 2.

It is also understood that the number of slots and pins can vary. In order not to introduce an unbalance, the pins and slots may be uniformly circumferentially spaced around the shafts. For instance, two diametrically opposed pins can be engaged into two diametrically opposed slots.

Figure 4:
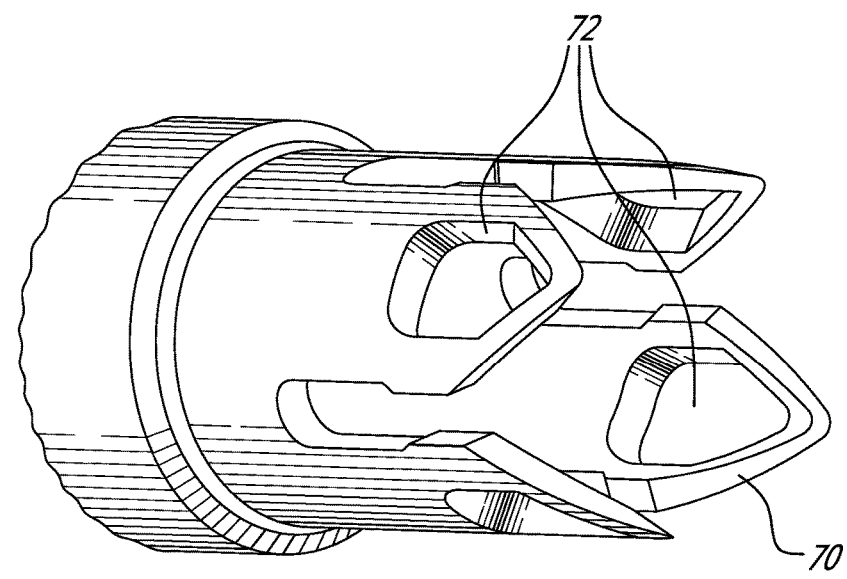
FIG. 4 is an isometric view illustrating some geometrical details of a lead end of the LPC shaft shown in FIG. 3.

As shown in FIG. 4, the fingers 70 (resultant of machining slots 52) on the lead end of the LPC shaft 23 could be optimized to reduce the centrifugal force effects (stress & displacement). For instance, holes 72 can be defined through the fingers 70. Also, the inner diameter of the lead end 50 may tapered over at least a portion of the fingers in an axial direction towards the splines 30a.

The above description is meant to be exemplary only, and one skilled in the art will recognize that changes may be made to the embodiments described without departing from the scope of the invention disclosed. For example, the length and angle of the alignment slots can vary. The diameter of the pin can vary. The shape of the pin can vary. It is understood that the spline alignment features could also be applied to other male and female spline assemblies and are thus not limited to the exemplified spline shaft arrangement. For instance, it could be used to provide proper spline alignment between a spline shaft and a hub of a rotor. Various applications are contemplated. Still other modifications which fall within the scope of the present invention will be apparent to those skilled in the art, in light of a review of this disclosure, and such modifications are intended to fall within the appended claims.

The invention claimed is:

1. A turbine shaft blind assembly comprising:
   first and second axially mating turbine shafts,
      the first turbine shaft having a circumferential array of splines configured to mesh with a corresponding circumferential array of splines on the second turbine shaft,
      the first turbine shaft defining at least one axially extending slot aligned with one of the splines on the first turbine shaft,
      the second turbine shaft having at least one radial projection aligned with one of the splines on the second turbine shaft, the engagement of the at least one radial projection with the at least one slot providing angular correspondence between the splines of the first and the second turbine shafts prior to axial engagement of the splines,
      wherein the at least one axially extending slot has an axially converging entry segment merging into an axially extending alignment segment aligned with the one spline of the splines of the first turbine shaft, the axially converging entry segment having a width in a circumferential direction that tapers as the axially converging entry segment extends towards the axially extending alignment segment, the axially extending alignment segment having a width in a circumferential direction corresponding to that of the at least one radial projection.

2. The turbine shaft blind assembly defined in claim 1, wherein the axially extending alignment segment of the at least one slot opens up on an enlarged end segment sized to provide a clearance in a circumferential direction with the at least one radial projection, the at least one radial projection being axially positioned on the second turbine shaft to fall into the enlarged end segment of the at least one slot once the splines of the first and second turbine shafts are axially engaged.

3. The turbine shaft blind assembly defined in claim 1, wherein the axially converging entry segment is configured as a triangular slot.

4. The turbine shaft blind assembly defined in claim 1, wherein the first turbine shaft is a male member, wherein the second turbine shaft is a female member, the male member being axially insertable into the female member, and wherein the at least one radial projection extends radially inwardly from an inner diameter of the female member.

5. The turbine shaft blind assembly defined in claim 4, wherein the male member has a lead end, the circumferential array of splines of the male member being axially inward of the lead end, the at least one slot being defined axially along the lead end.

6. The turbine shaft blind assembly defined in claim 5, wherein the at least one axially extending slot comprises at least two circumferentially spaced-apart slots along the lead end of the male member, the at least two circumferentially spaced-apart slots defining fingers therebetween, and wherein holes are defined in the fingers.

7. The turbine shaft blind assembly defined in claim 5, wherein the lead end has an inner circumferential surface, and wherein said inner circumferential surface tapers in an axial direction towards the circumferential array of splines on the male member.

8. The turbine shaft blind assembly defined in claim 7, wherein the at least one axially extending slot comprises at least two circumferentially spaced-apart slots along the tip of the male member, the at least two circumferentially spaced-apart slots defining fingers therebetween, and wherein holes are defined through the fingers.

9. The turbine shaft blind assembly defined in claim 4, wherein the male member is a low pressure compressor shaft and the female member is a power turbine shaft of a gas turbine engine.

10. The turbine shaft blind assembly defined in claim 1, wherein the at least one radial projection comprises a pin mounted in a radial hole defined through the second turbine shaft.

11. A gas turbine engine comprising:
a male member having a circumferential array of axially oriented splines configured to mesh with a corresponding circumferential array of axially oriented splines defined in a female member,
the male member having a lead end defining at least one slot for receiving at least one corresponding projection extending radially inwardly from the female member, the lead end of the male member projecting axially forward of the circumferential array of splines of the male member,
the at least one slot having a converging entry segment leading to an axial segment aligned with one of the splines on the male member, the converging entry segment of the at least one slot tapering towards the axial segment, the axial segment having a width in a circumferential direction corresponding to that of the at least one radial projection,
the at least one projection being aligned with one of the splines on the female member,
the at least one projection and the at least one slot being axially positioned relative to the splines of the male and female members so that the at least one projection is guided by the converging entry segment into the axial segment of the at least one slot prior to the splines on the male member engaging the splines of the female member when the male and female members are axially brought together.

12. The gas turbine engine defined in claim 11, wherein the at least one slot further comprises an enlarged end segment providing clearance with the at least one projection in a circumferential direction, the enlarged end segment being disposed axially inward of the axial segment.

13. The gas turbine engine defined in claim 11, wherein the male member is a low pressure compressor shaft and the female member is a power turbine shaft.

14. A method to provide self-alignment between splines of first and second axially mating turbine shafts of a gas turbine engine, the method comprising:
providing an alignment slot and a guide pin in respective ones of the first and second axially mating turbine shafts, the alignment slot having an axially converging entry segment followed by an axial segment, the axial segment being angularly aligned with one of the splines of the first turbine shaft, the guide pin being angularly align with one of the splines of the second turbine shaft, the axially converging entry segment of the at least one slot tapering towards the axial segment, the axial segment having a width in a circumferential direction corresponding to that of the at least one radial projection;
axially advancing the first and second turbine shafts towards each other so as to cause the guide pin to engage the converging entry segment of the alignment slot, wherein continued advancement of the guide pin in the converging entry segment of the alignment slot causes the first and second turbine shafts to rotate relative to each other until the guide pin engages the axial segment of the alignment slot, thereby angularly aligning the splines of the first and second axially mating turbine shafts; and further axially drawing the first and second axially turbine shafts towards each other so as to cause the splines of the first turbine shaft to engage the splines of the second turbine shaft.

15. The method defined in claim 14, wherein providing an alignment slot comprises providing an enlarged end segment to loosely receive the guide pin after the splines of the first and second mating turbine shafts have been engaged.

16. The method defined in claim 14, further comprising providing a lead end on the first turbine shaft, the lead end extending axially forwardly of the splines of the first turbine shaft, and wherein the alignment slot is defined in the lead end.

17. The method defined in claim 14, wherein the first turbine shaft is a low pressure compressor shaft of a gas turbine engine, and wherein the second turbine shaft is a power turbine shaft of the gas turbine engine.

\* \* \* \* \*